(12) United States Patent
Ramesohl

(10) Patent No.: US 6,595,772 B1
(45) Date of Patent: Jul. 22, 2003

(54) METHOD AND APPARATUS FOR THE THERMAL TREATMENT OF MEALY RAW MATERIALS

(75) Inventor: Hubert Ramesohl, Bergisch Gladbach (DE)

(73) Assignee: KHD Humboldt Wedag AG, Cologne (DE)

(*) Notice: Subject to any disclaimer, the term of this patent is extended or adjusted under 35 U.S.C. 154(b) by 0 days.

(21) Appl. No.: 09/564,462

(22) Filed: May 3, 2000

(30) Foreign Application Priority Data

May 3, 1999 (DE) .......................... 199 20 143

(51) Int. Cl.[7] ............................... F27B 15/00
(52) U.S. Cl. .................. 432/14; 432/106; 110/246; 110/346
(58) Field of Search .................... 432/14, 106; 110/246, 110/346

(56) References Cited

U.S. PATENT DOCUMENTS

| | | | |
|---|---|---|---|
| 4,627,877 A | * 12/1986 | Ogawa et al. | 106/745 |
| 4,747,879 A | * 5/1988 | Wolter et al. | 106/759 |
| 5,098,285 A | * 3/1992 | Bauer | 432/14 |
| 5,292,247 A | * 3/1994 | Bauer | 432/58 |
| 5,454,714 A | * 10/1995 | Paliard | 432/14 |
| 5,713,734 A | * 2/1998 | Makris et al. | 432/106 |
| 5,989,017 A | * 11/1999 | Evans | 432/14 |
| 6,254,382 B1 | * 7/2001 | Ramesohl et al. | 432/14 |

* cited by examiner

*Primary Examiner*—Jiping Lu
(74) *Attorney, Agent, or Firm*—Sonnenschein Nath & Rosenthal

(57) ABSTRACT

To create a calcinator for a cement clinker production line which is connected to the rotary tubular kiln in series and which is equipped with double firings, in which it is possible expediently to dispose of lumpy combustibles such as unchipped used tires and/or other lumpy secondary combustibles by pyrolysis or potentially by combustion for the purpose of the high-grade calcination of the cement raw meal, without the pyrolysis process interfering with the calcination process, while simultaneously ensuring an exhaust gas having low $NO_x$ emissions, it is inventively proposed to slide the lumpy fuel such as old tires onto a displacement mechanism such as a grate that is transversely disposed in an additional tertiary air channel in the area of the junction with the exhaust gas channel of the rotary kiln, the lumpy fuel being pyrolized or burned on this mechanism with the aid of a tertiary air substream whose volume can be regulated, and the residue of the pyrolysis or combustion being pushed from said displacement mechanism into the rotary kiln exhaust gas channel, into which channel the CO-laden pyrolysis gas, or respectively, smoke gas that is generated is also fed.

19 Claims, 1 Drawing Sheet

METHOD AND APPARATUS FOR THE THERMAL TREATMENT OF MEALY RAW MATERIALS

BACKGROUND OF THE INVENTION

The invention relates to a method for the thermal treatment of mealy raw materials, particularly in the reduction of cement clinker from raw meal, in which the raw meal is thermally treated in a combustion process by preheating, calcination, sintering and cooling, and the exhaust gas stream of the sintering stage (rotary kiln) and an exhaust airstream (tertiary air) of the cooling stage (clinker cooler) are used in such a way for the calcination of the raw meal in the calcination stage that fuel is introduced into both the rotary kiln exhaust gas channel and the tertiary air channel; the two channels are merged; and the gas-solid suspension contained therein is fed into the lowermost cyclone of the cyclone suspension type pre-heater system for the purpose of separating the calcinated raw meal from the gas stream. In addition, the invention relates to an apparatus for carrying out the method.

Methods and apparatuses of this type—which are known from EP-B-0 526 770, for example—must be in the position to generate a high-grade calcinated raw meal in the calcination stage, which is double-fired and which is connected to the rotary tubular kiln upstream, prior to transport into the rotary tubular kiln. At the same time, the builders and operators of the cement clinker production lines are confronted with ever stricter demands for low emission values of pollutants such as $NO_x$ and CO.

The builders and operators of cement clinker production lines are also confronted with the problem of using an optimally high proportion of lumpy fuels such as unchipped used tires and/or other lumpy and potentially inert combustibles which are difficult to ignite, or respectively, difficult to burn——which are referred to overall as secondary fuels——for the fuels that are used in the calcination stage, and of expediently disposing of such substances in this way for the calcination of the cement meal. Developments in the usage of used tires for the purpose of using their combustion energy are directed more and more to the utilization of large used tires, specifically truck tires, in the process without first chipping them into smaller lumpy particles by means of expensive comminution work.

It is known from EP-A-0 803 693 to insert whole automobile tires in a cement clinker production line into the rotary tubular kiln exhaust gas channel, or respectively, into the input shaft to the rotary tubular kiln in a recumbent position, as a result of which the used tires should gasify and burn in the input shaft, and the residual substances should drop down into the rotary tubular kiln. In this solution, it is disadvantageous that when a tire is pushed into the input shaft, the cross-section of the shaft is narrowed appreciably, which leads to a rise in pressure loss and to an unstable operation of the system. Furthermore, a table for bearing the used tires that are inserted, which is built into the input shaft as a grate or a solid plate, interferes with the normal process quite significantly, owing to the danger of sediment or crust formations. In addition, when a used tire is inserted, a concentrated energy addition suddenly arises in the input shaft, or respectively, in the area of the rotary tubular kiln input. Consequently, there is usually not enough oxygen remaining for the pyrolysis, vaporization, and combustion processes that commence immediately subsequent to this, so that undesirable CO surges, or respectively, CO peaks occur in the rotary tubular kiln exhaust gas, which can then lead to the deactivation of the electrostatic dust trap (electrofilter) downstream if the CO peaks exceed a defined limit value. The sudden presentation of energy in the process is usually undesirable, because the necessary streams of raw material mass are not spontaneously available for converting the heat into calcination work.

In the usage of used tires in cement clinker production, it is also known (EP-B-0 439 824) to burn the used tires in the rotary kiln input chamber, or respectively, in the stock input area of the rotary tubular kiln, with an oxygen surplus. Here, the excess oxygen must be drawn through the whole rotary tubular kiln in the form of excess secondary air. Undesirable CO surges occur here also, which limit the amount of the charge of used tires.

Finally, the journal "Zement-Kalk-Gips" (1/1999) has made known a calcination system having a separate secondary reactor, which is called a shaft vaporizer, in which whole used tires are vaporized, the resulting gas product being fed to the calcinator in a separate conduit. The residual matter of the used tires that have been vaporized in the shaft vaporizer should be transported into the input shaft of the rotary kiln by a mechanical push mechanism. In this shaft vaporizer, the inserted tires fall from above onto a non-gas-permeable table, and the tertiary air substream that is used as vaporization medium is likewise fed into the shaft vaporizer (reactor) from above. By virtue of the direct feeding of the pyrolysis gas from the shaft vaporizer into the calcinator, the actual calcination process, which occurs only in the rotary kiln exhaust gas line in the known system, is influenced by a vaporization or pyrolysis process, which may undergo sharp fluctuations. Greater and greater amounts of secondary fuel are located in the reactor. This necessitates a special safety mechanism in order to be able to bleed off the pyrolysis gas via the roof in accordance with the corresponding safety specifications in case of a disruption of the overall system.

SUMMARY OF THE INVENTION

It is an object of the invention to create, in cement clinker production lines of the above described type, a double fired calcinator that is connected upstream to the rotary tubular kiln, in which calcinator particularly lumpy combustibles, such as unchipped used tires and/or other lumpy secondary combustibles, can be expediently disposed of by pyrolysis —or optionally by combustion—for the calcination of the cement raw meal, without the pyrolysis process, or respectively, the combustion process, interfering with the calcination process, and without giving rise to pulsations in the overall system, while simultaneously ensuring a residual burnout of CO surges and also ensuring an exhaust gas having low $NO_x$ emissions.

It is characteristic of the inventive calcination stage of a cement clinker production line that a lumpy combustible such as a whole used tire is slid onto a displacement mechanism such as a grate, which is arranged transversely in a tertiary air channel in the area of the junction with the exhaust gas channel of the rotary tubular kiln, on which table the lumpy fuel is pyrolized by means of a tertiary air substream that is diverted from the tertiary air line, and from which table the pyrolysis residue is pushed into the exhaust gas channel of the rotary kiln. The pyrolysis gas is likewise fed into the rotary kiln's exhaust channel, where it forms a CO-laden reduction zone (CO cloud) for the purpose of reducing the $NO_x$ contained in the rotary kiln exhaust.

The tertiary air channel that is provided for the pyrolysis of the lumpy fuel is a pyrolysis channel to the extent that, in the area of its inlet into the rotary kiln exhaust channel, it is constructed as a pyrolysis chamber for the pyrolysis of the lumpy fuel, for instance used tires. In the pyrolysis chamber, the grate is arranged for accepting the lumpy fuel (e.g. used tires) such that, proceeding approximately from the junction region between the rotary kiln's exhaust gas channel and the pyrolysis channel, it extends transversely over at least part of the cross-section of the of the pyrolysis chamber. Outside the pyrolysis chamber, an apparatus for introducing the lumpy fuel (e.g. used tires) is arranged laterally at the pyrolysis channel.

As lumpy fuel, besides unchipped used tires, other secondary combustibles can be introduced into the pyrolysis channel, or respectively, the pyrolysis chamber, such as compacted residual resources from garbage, plastic material or other combustible substances which have been previously compacted in a separate process outside of the cement clinker production process. The grate, which is penetrated by a territory air substream, for accepting the lumpy fuel in the pyrolysis chamber can be arranged horizontally or at an oblique inclination to the junction area between the exhaust gas channel of the rotary kiln and the pyrolysis channel. The grate advantageously stands in connection with a pushing mechanism for discarding the pyrolysis residue, or respectively, the unburned residual matter, into the exhaust gas channel of the rotary kiln. The grate can also be a traveling grate.

The pyrolysis channel that has the pyrolysis chamber for the pyrolysis of the lumpy fuel is not integrated in the actual calcination channel, which is also penetrated by a tertiary air substream and which has at least one raw meal input and at least one fuel input; rather, it is installed next to this calcination channel. The pyrolysis channel is advantageously arranged between the rotary kiln exhaust channel and the calcination channel, which opens into the exhaust gas channel of the rotary kiln above the junction of the pyrolysis channel and the exhaust gas channel of the rotary kiln. Given this inventive integration of the pyrolysis channel for the lumpy fuel into the calcination stage of a cement clinker production line, the calcination channel, with the raw meal calcination process that transpires there, is not disturbed by the pyrolysis process, even when large obtrusive solids are pyrolized, and so pulsations do not arise in the gas flow of the overall system. The pyrolysis process can advantageously be controlled in a process-dependent manner by means of an adjusting valve that controls the air supply. At the same time, the CO cloud that results from the pyrolysis of the lumpy fuel is an effective medium for reducing $NO_x$ in the exhaust gas. Downstream from the junction of the exhaust channel of the rotary kiln and the pyrolysis channel, an additional tertiary air substream empties into the exhaust gas channel of the rotary kiln for the combustion of the CO strands that may have remained outside the reduction zone and/or of other fuel components that have remained unburned, for the purpose of a residual burnout of such residual combustibles.

BRIEF DESCRIPTION OF THE DRAWINGS

The invention and its features and advantages are detailed below with the aid of the exemplifying embodiment that is schematically represented in the figures.

DETAILED DESCRIPTION OF THE PREFERRED EMBODIMENTS

Figure 1:
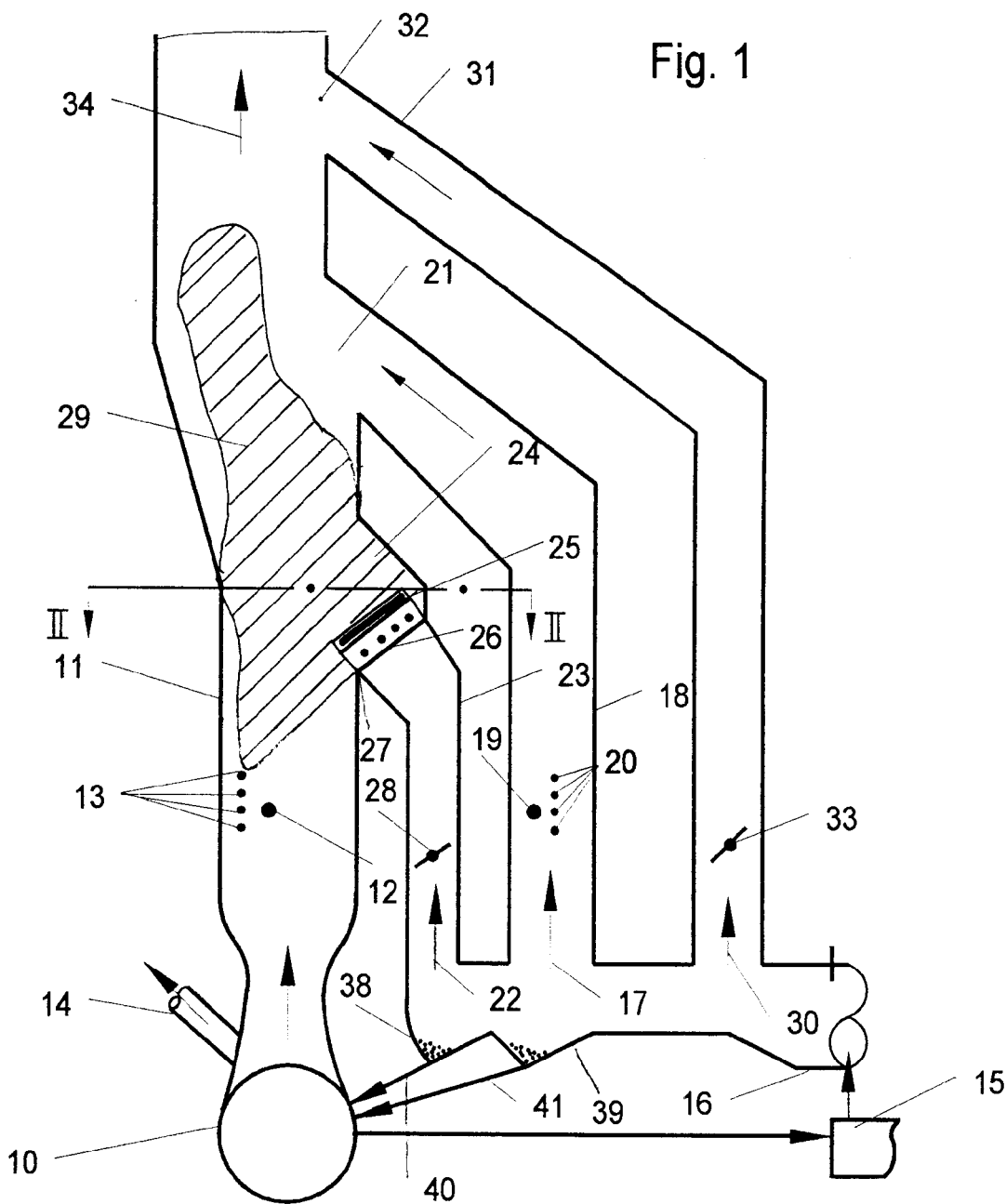
FIG. 1 is a schematic sectional illustration of a side view of the calcination stage, or respectively, the calcinator, of an apparatus for producing cement clinker from cement raw meal.

The cement clinker production line with a calcinator as illustrated in FIG. 1 comprises a rotary tubular kiln 10 having an exhaust gas channel 11 which leads up to the lowermost cyclone of a cyclone suspension type pre-heater system. Although the entire system is not illustrated, U.S. Pat. Nos. 4,747,879 and 5,098,285 disclose generally a complete system, and the disclosures of those references are incorporated herein by reference. The pre-heater raw meal which is separated out of the exhaust gas stream in the second-to-last (second lowest) cyclone is divided, and one raw meal substream goes via a raw meal feed 12 into the exhaust gas channel 11 of the rotary kiln, which channel is provided above, below and/or at the level of the raw meal feed 12 with at least one combustion point 13 (four combustion points 13 in the exemplifying embodiment), at which fuel is burned with an oxygen surplus or with an oxygen deficit, preferably flamelessly. The rotary kiln 10 can be equipped with a gas sub-vent, or respectively, a bypass gas vent 14 in the region of its input chamber.

The cement clinker which is generated in the rotary tubular kiln 10 from the calcinated cement raw meal is cooled in a clinker cooler 15. A part of the cooler exhaust air that is drawn out of the clinker cooler 15 is conducted to the calcinator as tertiary air via tertiary air conduit 16. A substream 17 of the tertiary air is drawn through a calcination channel 18, which is equipped with at least one raw meal feed 19, which likewise consists of the second to last (second lowest) cyclone stage of the cyclone suspension type pre-heater system, and with at least one combustion point 20 (four combustion points 20 in the exemplifying embodiment), which can be arranged above, below and/or at the same level as the raw meal feed 19. The exhaust gases of the calcination channel 18 empty into the exhaust gas channel 11 of the rotary tubular kiln at 21.

In the inventive calcinator, an additional tertiary air channel through which a tertiary air substream 22 flows is present as a pyrolysis channel 23 to the extent that, in the region of its transition or junction into the exhaust channel 11 of the rotary kiln, it is constructed as pyrolysis chamber 24 for pyrolizing or burning lumpy combustibles such as unchipped used tires 25, which are borne on a solid plate or an open plate such as a grate 26 that is permeated by tertiary air substream 22. The grate 26 extends transversely over at least part of the cross-section of the pyrolysis chamber 24 proceeding approximately from the junction area 27 between the exhaust gas channel II of the rotary kiln and the pyrolysis channel 23. The size or flow rate of the tertiary air substream 22 flowing into the pyrolysis chamber 24 can be controlled by adjusting the regulating flap 28. The pyrolysis process is also controlled in this way; that is, in addition to the CO cloud that can be generated in the sub-stoichiometric fuel combustion at the combustion points 13, it is possible to generate the CO-laden cloud 29 (hatched area in FIG. 1) which effectively cooperates in hindering the ability of $NO_x$ formations that come from the rotary kiln 10 to get into the upper areas of the inventive calcination system. Downstream from the junction of the exhaust gas channel 11 of the rotary kiln and the pyrolysis channel 23 (also after the mouth of the calcination channel 18 in the exemplifying embodiment), a further additional tertiary air substream 30 empties into the exhaust gas channel 11 of the rotary kiln, which substream is diverted from the tertiary air line 16 coming from the clinker cooler via at least one additional bypass line 31. This tertiary air substream 30 which empties at 32 serves for the optimally complete residual burnout of the CO that has not been completely converted in the exhaust gas channel 11 of the rotary kiln and of other combustible exhaust gas constituents that may be present. The volume flow of the tertiary air 30 that is fed in via the bypass line 31 can be controlled via a regulating mechanism 33 such as an air flap.

A suspension of gas, raw meal and fuel, as well as combustion products flows upwardly as at 34, and is intimately mixed in a mixing chamber or which chamber is located in an area of the exhaust gas channel of the rotary kiln where the direction of the flow is diverted, such as by an inverted U-shaped portion of the exhaust gas channel 11 above (downstream) of the opening 32 of the further additional tertiary air stream 30 into the exhaust gas channel.

Figure 2:
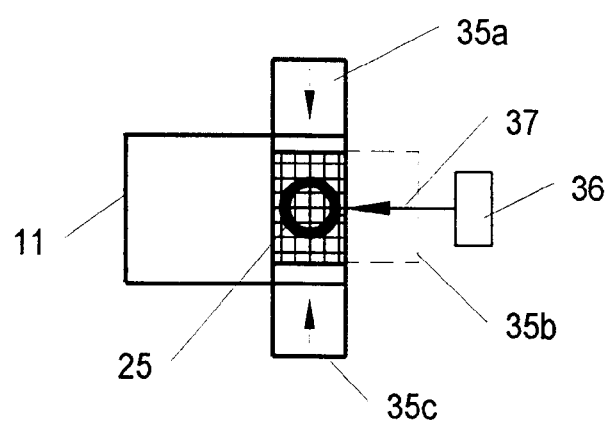
FIG. 2 is a plan view of a section along the line II—II of FIG. 1.

As clearly emerges from FIG. 2, a mechanism 35a or 35b or 35c, respectively, for supplying the pyrolysis chamber 24 with the lumpy fuel, e.g. used tires, is arranged outside the pyrolysis chamber at the side of the pyrolysis channel 23, the direction of insertion being dependent on the spatial structural situation of the calcinator. The insertion mechanisms are sealed with respect to the calcination system so as to be gas-tight, in order to prevent the improper entry of air. The grate 26 also stands in connection with a push mechanism 36, which has a preferred push direction 37 as indicated in FIG. 2, in order to push the pyrolysis residue 11, or respectively, the unburned residual matter, by tilting, pivoting, or shaking the grate, into the exhaust gas channel 1 of the rotary kiln, from where this residual matter is directed into the rotary tubular kiln 10.

The grate 26 in the pyrolysis chamber 24 can consist of a suitable material having a high thermal resistance or can be indirectly cooled. The grate 26 can also consist of a traveling grate, with the direction of motion being from 35a to 35c, for example.

In any case, in the inventive calcination system, the pyrolysis of the lumpy combustion material in the pyrolysis chamber 24 can occur so as to proceed sub-stoichiometrically; that is, in such a way that a highly concentrated CO-laden atmosphere 29 is purposely generated in the exhaust channel 11 of the rotary kiln, in order to reduce kiln-related $NO_x$. At the same time, used tires and other lumpy secondary combustibles up to and including sealed plastic waste containers are inventively disposed of in an expedient manner and are utilized in the production of high-grade calcinated cement raw meal.

The dust, for instance ash, that falls through the grate 26 and the pyrolysis channel 23, as well as the dust that falls through in the neighboring calcination channel 18, can be respectively collected in a teat 38 or 39, respectively, and this fine-grain matter can potentially be fed directly into the rotary tubular kiln 10 via lines 40, 41, depending on the spatial relations in the calcination apparatus.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A method for the thermal treatment of mealy raw material, specifically in the production of cement clinker from raw meal, in which the raw meal is thermally treated in a combustion process by preheating, calcination, sintering, and cooling, and an exhaust gas stream of the sintering stage in a rotary kiln and an exhaust airstream formed of tertiary air of the cooling stage from a clinker cooler are used in a calcination stage for the calcination of the raw meal in such a way that fuel is fed into both an exhaust gas channel of the rotary kiln and a first tertiary air channel, the two channels are merged, and a gas-solid suspension that is contained therein is fed into a lowermost cyclone of a cyclone suspension type pre-heater system for the purpose of separating calcinated raw meal out of the gas stream, comprising the steps of:

introducing lumpy fuel via a displacement mechanism that is arranged transversely in an additional tertiary air channel in an area of a junction of the additional tertiary air channel with the exhaust gas channel of the rotary kiln;

pyrolizing or burning said lumpy fuel on the displacement mechanism with the aid of a tertiary air substream; and moving a residue of the pyrolysis, or respectively, a combustion, from a displacement mechanism into the exhaust gas channel of the rotary kiln, while a pyrolysis gas, or respectively, a smoke gas, is likewise directed into the exhaust gas channel of the rotary kiln.

2. A method as claimed in claim 1, wherein introducing lumpy fuel comprises sliding unchipped used tires into the additional tertiary air channel.

3. A method as claimed in claim 1, wherein introducing lumpy fuel comprises sliding garbage or plastic which has previously been compacted.

4. A method as claimed in claim 1, wherein a grate which is permeated by the tertiary air substream from below is used as the displacement mechanism for the lumpy fuel.

5. A method as claimed in claim 1, wherein any pyrolysis residue, or respectively, any unburned residual matter, is moved from the displacement mechanism into the rotary kiln exhaust gas channel automatically via a material ramp.

6. A method as claimed in claim 1, wherein any pyrolysis residue, or respectively, any unburned residual matter, is moved from the displacement mechanism into the rotary kiln exhaust gas channel by the movement of the displacement mechanism.

7. A method as claimed in claim 1, wherein the lumpy fuel that has been introduced into the additional tertiary air channel and onto the displacement mechanism, is burned in the tertiary air substream sub-stoichiometrically with an oxygen deficit to form a CO-laden reduction zone in the rotary kiln exhaust gas channel for reducing $NO_x$ coming from the rotary kiln, and a further additional substream of tertiary air is directed into the suspension downstream as viewed from the junction of the exhaust gas channel of the rotary kiln and the additional tertiary air channel, in order to accomplish a residual burnout of the CO-laden reduction zone.

8. A method as claimed in claim 1, wherein raw meal and fuel are fed into the exhaust gas channel of the rotary kiln below the junction with the additional tertiary air channel.

9. A method as claimed in claim 1, wherein the first tertiary air channel, through which flows a tertiary air substream and into which raw meal and fuel are fed, opens into the exhaust gas channel above the junction with the additional tertiary air channel.

10. An apparatus for the thermal treatment of mealy raw material, specifically in the production of cement clinker from raw meal, in which the raw meal is thermally treated in a combustion process by preheating, calcination, sintering and cooling, and the exhaust gas stream of the sintering stage in a rotary kiln and an exhaust airstream formed of tertiary air of the cooling stage from a clinker cooler are used in a calcination stage for the calcination of the raw meal in such a way that at least one combustion point exists in both an exhaust gas channel of the rotary kiln and a first tertiary air channel, the two channels are merged, and a gas-solid suspension contained therein is fed into a lowermost cyclone of a cyclone suspension type pre-heater system for the purpose of separating calcinated raw meal from the gas stream, comprising:

a) an additional tertiary air channel, in a region of a transition of the additional tertiary air channel into the rotary kiln exhaust gas channel, constructed as a pyrolysis chamber for pyrolizing lumpy fuel;
   b) a displacement mechanism located in the pyrolysis chamber for accepting the lumpy fuel extends transversely over at least part of a cross-section of the pyrolysis chamber proceeding approximately from a junction area between the exhaust gas channel and the additional tertiary air channel; and
   c) a device for introducing the lumpy fuel from the exterior of the pyrolysis chamber to the inside of the pyrolysis chamber.

11. An apparatus as claimed in claim 10, wherein the displacement mechanism for accepting the lumpy fuel is a plate which is disposed horizontally and the plate is connected with a push mechanism for discarding any pyrolysis residue into the exhaust gas channel of the rotary kiln.

12. An apparatus as claimed in claim 11, wherein the push mechanism for the plate is a device for at least one of swivelling, tilting, pushing and shaking the plate.

13. An apparatus according to claim 10, wherein the displacement mechanism is a plate disposed at an oblique angle to the junction area between the exhaust gas channel of the rotary kiln and the additional tertiary air channel.

14. An apparatus according to claim 10, wherein the displacement mechanism for accepting the lumpy fuel is a plate that is permeated by a tertiary air substream.

15. An apparatus according to claim 10, wherein displacement mechanism for accepting the lump fuel is a solid plate that is surrounded by a tertiary air substream.

16. An apparatus as claimed in claim 10, wherein the first tertiary air channel, through which a tertiary air substream is also directed and which has at least one combustion point and at least one raw meal feed, opens into the rotary kiln exhaust gas channel above the transition of the additional tertiary air channel into the exhaust gas channel of the rotary kiln.

17. An apparatus as claimed in claim 10, wherein at least one combustion point and at least one raw meal feed are disposed in the exhaust gas channel of the rotary kiln beneath the transition of the additional tertiary air channel into the exhaust gas channel.

18. An apparatus as claimed in claim 10, wherein downstream from the junction of the exhaust gas channel of the rotary kiln and the additional tertiary air channel, a tertiary air substream, which is diverted via at least one additional bypass line from a tertiary air line coming from the clinker cooler, empties into the exhaust channel of the rotary kilm.

19. An apparatus as claimed in claim 10, wherein a mixing chamber, for the intimate mixing of the suspension of the gas, raw meal and fuel is arranged in the calcination stage in an area of a flow diversion.

* * * * *